UNITED STATES PATENT OFFICE.

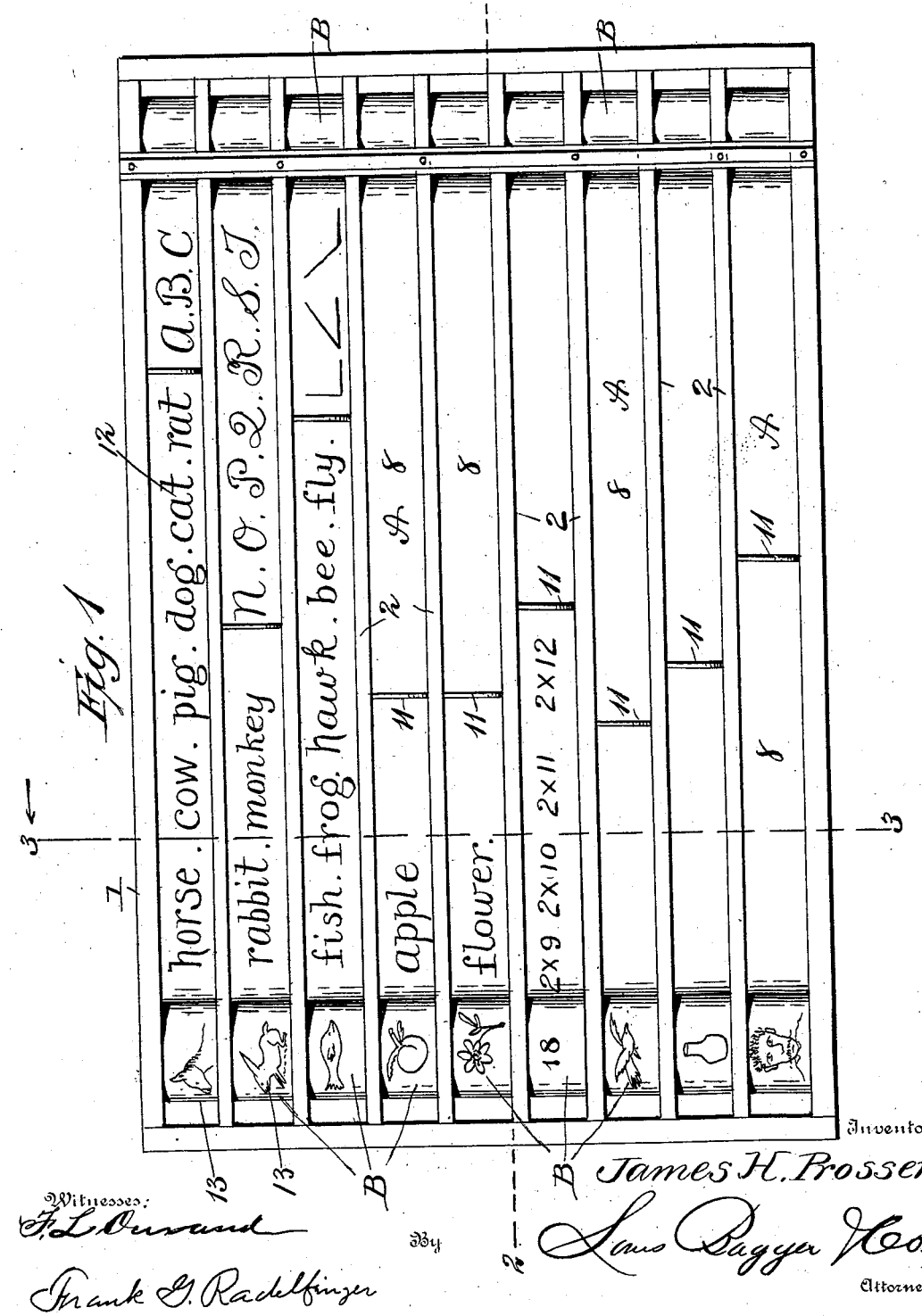

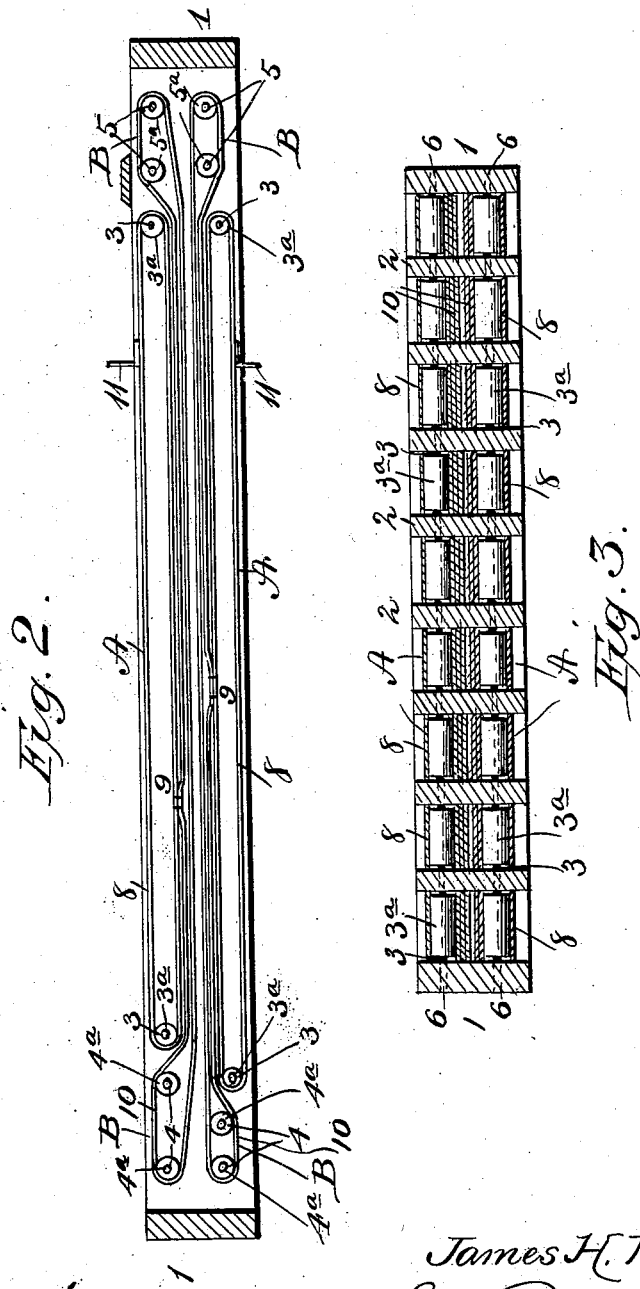

JAMES H. PROSSER, OF MAHANOY CITY, PENNSYLVANIA.

EDUCATIONAL FRAME.

SPECIFICATION forming part of Letters Patent No. 718,520, dated January 13, 1903.

Application filed October 18, 1902. Serial No. 127,821. (No model.)

*To all whom it may concern:*

Be it known that I, JAMES H. PROSSER, a citizen of the United States, residing at Mahanoy City, in the county of Schuylkill and State of Pennsylvania, have invented new and useful Improvements in Educational Frames, of which the following is a specification.

My invention relates to an educational frame, and has for its object to construct a device of this character for teaching reading, spelling, arithmetic, &c.

The simple and novel construction employed by me in carrying out my invention is fully described in this specification and claimed, and illustrated in the accompanying drawings, forming a part thereof, in which—

Figure 1 is a plan view of my frame. Fig. 2 is a section on the line 2 2, Fig. 1. Fig. 3 is a section on the line 3 3, Fig. 1.

Like characters of reference designate like parts in the different views of the drawings.

The numeral 1 designates a rectangular frame divided into compartments by a number of horizontal partitions 2. Shafts 3, 4, and 5 are mounted in transverse apertures 6 in the partitions. There are four members in each of these three groups of shafts arranged opposite to each other, making twelve in all. Rollers $3^a$, $4^a$, and $5^a$ are mounted on the shafts 3, 4, and 5, respectively, intermediate the partitions 2. Endless belts 8 pass around the pairs of rollers $3^a$, and these belts are connected at 9 to belts 10, which pass around the two pairs of rollers $4^a$ and $5^a$, which are mounted on the shafts 4 and 5. By this arrangement the belts 8 are visible at A throughout one-half of their complete length—that is, the distance between the rollers $3^a$—while the belts 10 are only visible at B between the rollers $4^a$ and $5^a$ on the outer side. An ear 11 is formed on each of the belts 8 to serve as a handle for operating the belts 8. It will be noted that there are two sets of the belts 8 and 10, one set of which can be seen from one side of the frame and the other can only be seen from the other side, so that two distinct devices are formed which are brought into use by turning over the frame. On the upper belt 8 appears a series of words 12—"Dog," "Cat," "Pig," "Cow," &c.—and on the corresponding belt 10 are printed the pictures 13 of the animals designated by the words on the belt 8. It is evident that by pulling the ear 11 the belts 8 and 10 can be operated in unison. This enables me to so arrange the words 12 and the pictures 13 that the picture appears at B on the belt 10 just as the name corresponding to the picture appears on the left of the belt 8. In teaching arithmetic the factors can be made to appear on the belt 8 simultaneously with the product on the belt 10, and so on for different subjects. Independent series of objects and names may also be printed on the belts 8 and 10.

I do not wish to be limited as to details of construction, as these may be modified in many particulars without departing from the spirit of my invention.

Having thus described my invention, what I claim as new, and desire to secure by Letters Patent, is—

1. In a device of the class described, the combination of a pair of rollers, an endless belt mounted on said rollers, two pairs of rollers, and an endless belt mounted on said two pairs of rollers and connected to said first-mentioned endless belt, substantially as described.

2. In an educational device, the combination of a first endless belt bearing names, and a second endless belt connected to said first endless belt and bearing pictures corresponding to said names, substantially as described.

3. In an educational frame, the combination of a first endless belt mounted on rollers and bearing means for operating it, a second endless belt passing behind said first endless belt and around rollers located beyond the said first-mentioned rollers, said endless belts being connected to move in unison, substantially as described.

4. In an educational frame, the combination with a frame divided into a plurality of compartments, a pair of rollers mounted in each compartment and bearing an endless belt, two pairs of rollers mounted in said compartments and located beyond said rollers, an endless belt passing around said two pairs of rollers, said belts being connected to move in unison, substantially as described.

In testimony whereof I have hereunto set my hand in presence of two subscribing witnesses.

JAMES H. PROSSER.

Witnesses:
F. J. SMITH,
H. T. BAGENSTOSE.